United States Patent
Safadi et al.

(10) Patent No.: US 6,256,393 B1
(45) Date of Patent: Jul. 3, 2001

(54) AUTHORIZATION AND ACCESS CONTROL OF SOFTWARE OBJECT RESIDING IN SET-TOP TERMINALS

(75) Inventors: Reem Safadi, Horsham; Lawrence Vince, Lansdale, both of PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/257,274

(22) Filed: Feb. 24, 1999

Related U.S. Application Data

(60) Provisional application No. 60/090,297, filed on Jun. 23, 1998.

(51) Int. Cl.$^7$ .................................................. H04N 7/167
(52) U.S. Cl. .......................... 380/232; 380/211; 380/229; 380/231; 380/233; 380/234; 380/241; 380/242; 705/58; 705/59; 705/77; 713/165; 713/166; 713/167; 713/187; 713/191
(58) Field of Search .................... 380/211, 229, 380/231, 232, 233, 234, 241, 242; 705/58, 59, 77; 713/165, 166, 167, 187, 191

(56) References Cited

U.S. PATENT DOCUMENTS

| | | | |
|---|---|---|---|
| 4,712,239 | 12/1987 | Frezze et al. | 380/20 |
| 5,003,591 | 3/1991 | Kauffman et al. | 380/10 |
| 5,572,590 | 11/1996 | Chess | 380/4 |
| 5,724,425 | * 3/1998 | Chang et al. | 380/25 |
| 5,740,246 | * 4/1998 | Saito | 380/21 |
| 5,870,474 | * 2/1999 | Wasilewski et al. | 380/21 |
| 5,943,422 | * 8/1999 | Van Wie et al. | 390/9 |
| 6,061,451 | * 5/2000 | Mratani et al. | 380/201 |
| 6,069,647 | * 5/2000 | Sullivan et al. | 380/5.5 |

FOREIGN PATENT DOCUMENTS

| | | | |
|---|---|---|---|
| 0 813 133 A2 | 12/1997 | (EP) | G06F/1/00 |
| 0 827 329 A1 | 3/1998 | (EP) | H04N/1/32 |
| 0 848 314 A1 | 6/1998 | (EP) | G06F/1/00 |
| WO97/25798 | 7/1997 | (WO) | H04L/9/00 |
| WO99/07149 | 2/1999 | (WO) | H04N/7/16 |

* cited by examiner

Primary Examiner—Tod Swann
Assistant Examiner—Paul E. Callahan
(74) Attorney, Agent, or Firm—Mayer, Fortkort & Williams, PC; Karin L. Williams, Esq.

(57) ABSTRACT

A method for providing authentication, authorization and access control of software object residing in digital set-top terminals creates a fingerprint ("signature") for each software object, associates each fingerprint with a service tier, encodes each association and creates an association table containing the information and downloads the association table to the digital set-top terminal. In addition, the method utilizes an entitlement management message, sent to each set-top terminal, indicating what software objects the set-top terminal may utilize, and provides a system routine at the digital set-top terminal that is invoked whenever software object is about to be utilized. The entitlement management message contains the access rights given to a particular set-top terminal, which must match the software object's access requirements for the software object to be utilized. The entitlement management message may also contain set-top terminal resource control access rights that a given software object may utilize. When the software object requires the utilization of a set-top resource, a second conditional access routine may be invoked to determine the authorization rights for using the resource. Measures to protect such means are also described. As such the method provides multiple system cable operators (MSO's) with additional capabilities to maintain secure control of features and applications running on their networks and within the associated set-top terminals.

31 Claims, 4 Drawing Sheets

AUTHORIZATION AND ACCESS CONTROL OF SOFTWARE OBJECT RESIDING IN SET-TOP TERMINALS

This application claims the benefit of U.S. Provisional Application No. 60/090,297, filed Jun. 23, 1998.

FIELD OF THE INVENTION

The present invention relates generally to a method for providing authorization, authentication and access control of "executable code", or, "software object", which includes but is not limited to application code, operating systems and associated components (e.g. dynamic link libraries—DLL's), BIOS, Java Virtual Machine (JVM), Java applications and applets, etc., residing in set-top terminals.

BACKGROUND OF THE INVENTION

As digital set-top terminals (the General Instrument DCT5000+, for example), incorporate the capability to download different operating systems, DLL's, JVM's (Windows CE included), multiple system cable operators (MSO's) need a mechanism that will allow them to maintain control of the features and applications that run within these set-top terminals. More specifically, MSO's want the ability to access control services and associated usage of software objects in set-top terminals.

One known attempt to address the authenticity of code objects for the PC environment is Microsoft's "Authenticode" capability. This product enables software vendors to acquire a digital signature for published executable code. Authenticode provides a digital signature with only one signer; the code is signed with Microsoft's private key (which is not published) and is verified with Microsoft's public key, which is bundled into the Authenticode verification code in the operating system. However, while Authenticode provides digital signature protection for executable code, it does not provide any means of determining access requirements for the executable code for access control purposes (and revenue generation purposes), and it is applicable only to executable code.

A second known attempt to address control of Java applets is "Java Security" which is intended to prevent applets from inspecting or changing files on a client system and from using network connections to circumvent file protections or data privacy measures. However, as is the case with Authenticode, Java Security does not offer authentication of any software object unless it is Java based, nor does it offer the association with access requirements for access control and revenue generation purposes.

Although each of the products described above attempt to address protection and control of software object in a PC environment against unauthorized utilization by a given set-top terminal, they do not fully address the issues associated with authorization, authentication and access control, and thus, do not provide an optimal solution that meets MSO requirements.

SUMMARY OF THE INVENTION

As set-top terminals assume a computing environment for entertainment purposes by utilizing downloadable software objects such as operating systems, libraries, Java Virtual Machines, applications, applets, etc., it becomes extremely critical to protect and control the software object to guard against unauthorized utilization by a given set-top terminal. In accordance with the proposed concept, not only does the identity of each software object require authentication but also, its utilization has to be subject to MSO control via authorization permissions along with control of which set-top terminal resources a given software object may use. These measures complement those of object validation and verification and ensure that software objects that have not been authenticated are not utilized. To the extent that these measures are utilized, the set-top terminal is no longer subject to problems associated with objects that have failed to follow the security design rules, or worse yet, those which may be contaminated with a virus that is meant to cause harm to the MSO's network and associated set-top terminals.

In a particular embodiment of the invention, a method for providing authorization and access control of software object residing in digital set-top terminals creates a fingerprint (signature) for each software object, associates each fingerprint with a service tier, encodes each association and creates an association table containing the information generated by the encoding step (note, this table may consist of one or more association entries). In addition, the method sends the association table to the digital set-top terminal and also transmits a message indicating what software objects the set-top terminal may utilize, to the digital set-top terminal. Finally the proposed method provides a system routine at the digital set-top terminal that is invoked prior to commencing download of the object, once the software object has been downloaded, or optionally whenever the software object is about to be utilized (or "invoked" if it is executable code). The system routine uses the association table to validate the authenticity of the object (authenticate it) and to determine if the software object about to be utilized is associated with a corresponding service tier which the set-top has been authorized for, if not the software object download (or utilization) is not allowed. If however the software object about to be downloaded (or utilized) is associated with a service tier for which the set-top has been authorized, the object download (or utilization) is allowed. In accordance with another aspect of the invention, the software object has been verified and validated prior to the recited steps.

In accordance with still another aspect of the invention, the transmitted message further indicates which set-top terminal resources the software object or the set-top as a whole is authorized to utilize.

Yet a further advantage provided by another feature of the present invention is that if the software object about to be invoked contains the correct fingerprint and authorization rights match the authorization requirements associated with the software object, the method further determines if the use of set-top terminal resources has been authorized. In one embodiment, if a determination is made that the use of a set-top terminal resource has been requested, the method further provides a second system routine at the digital set-top terminal, and the second system routine uses the transmitted messages to determine if the software object may utilize the requested set-top terminal resource. In the case where the resource is authorized as in Impulse-authorizable resource (by associating it with an impulse tier in the message), the user is allowed to request an impulse (immediate) authorization of this resource. This prevents the subscriber (user) from having to call the MSO's Customer Service Center for such authorization.

A further advantageous feature of the invention is that if the software object about to be utilized does not contain the correct fingerprint, the software object is not executed.

DETAILED DESCRIPTION OF THE INVENTION

Multiple system cable operators need to extend access control capabilities, i.e., to control the ability to access and use software objects in set-top terminals capable of downloading such objects and later utilizing these objects if their download and use is authorized and the objects pass authentication checks.

Access control of a software object, in accordance with one aspect of the invention, consists of three parts. The first defines the access requirements for a particular service (and associated objects), and the second defines the authorization rights for a particular set-top terminal to access these services (and associated objects). The third provides additional identification information to enable the set-top terminal to authenticate the objects prior to their utilization. The access requirements may be considered as the lock, and the authorization rights may be considered as the key. When the authorization rights match the access rights (and no parental control is required), the set-top terminal is allowed to access the service (and associated objects).

There are two types of messages that facilitate the access control function. First, the Entitlement Control Message (ECM) delivers the Entitlement Control Structure (ECS) (explained in further detail below) which contains the Entitlement Control Record (ECR) (also explained in detail below) for the associated objects and lists the entitlement information required for program viewing or object(s) use. The second message, the Entitlement Management Message (EMM) delivers the entitlements purchased by or granted to the consumer. The functions of each of these messages are described in greater detail below.

The following provides an outline of how software objects are authorized to run (post authentication). All software objects that are not authorized (and authenticated) in this manner will not be usable by the set-top terminal. In the event that all preventive measures intended to keep unauthorized software objects from residing within the set-top terminal fail, this approach aids in detecting such applications and in preventing their utilization or execution.

In the digital set-top terminal, the utilization of all software objects (including applications associated with a given service) must be authorized by the access control system. The software object is specified to consist of downloadable code or data that may be utilized in the set-top terminal at either the subscriber's or the MSO's will.

Figure 1:
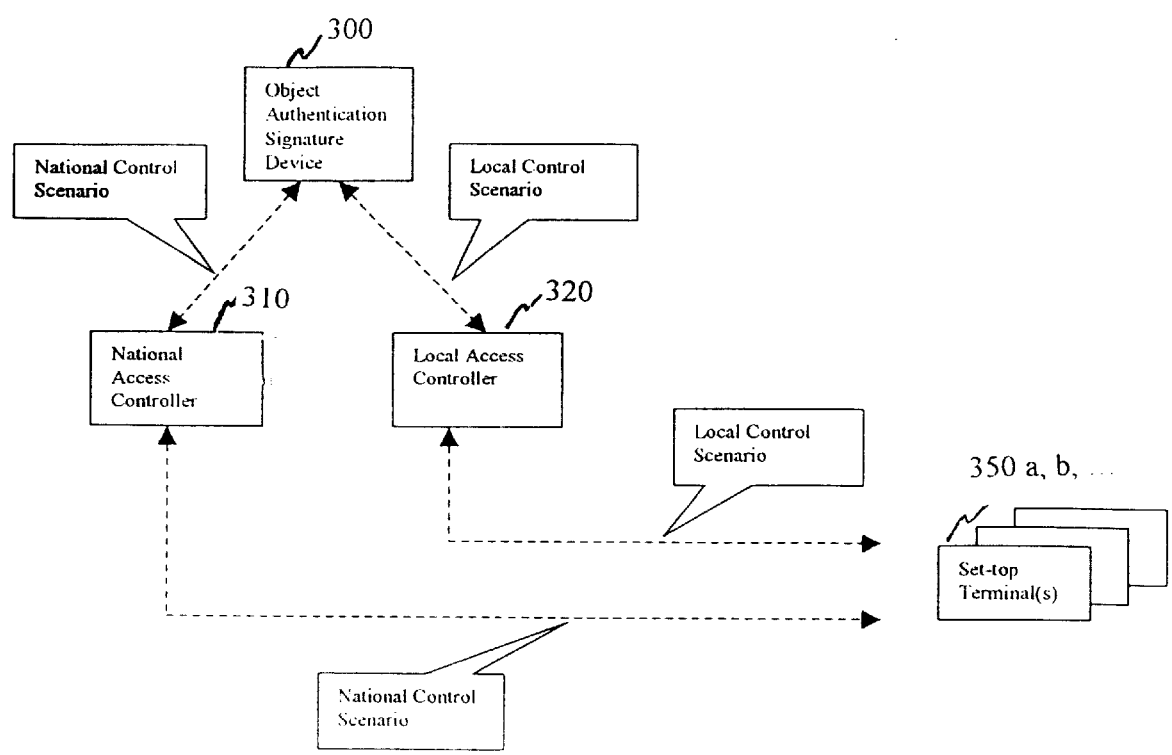
FIG. 1 is a simplified block diagram illustrating the logical paths of a cable system relevant to the description of the invention.

First, as illustrated in the block diagram of FIG. 1, an Object Authentication Signature Device 300 (OASD) utilizes either a National Access Controller 310 (NAC) (in the national control scenario) or a Local Access Controller 320 (LAC) (in the local control scenario) to interact with a number of set-top terminals 350a, 350b, etc. The details of the interactions of each of these devices are described in detail below in connection with the detailed description of the invention.

Figure 2:
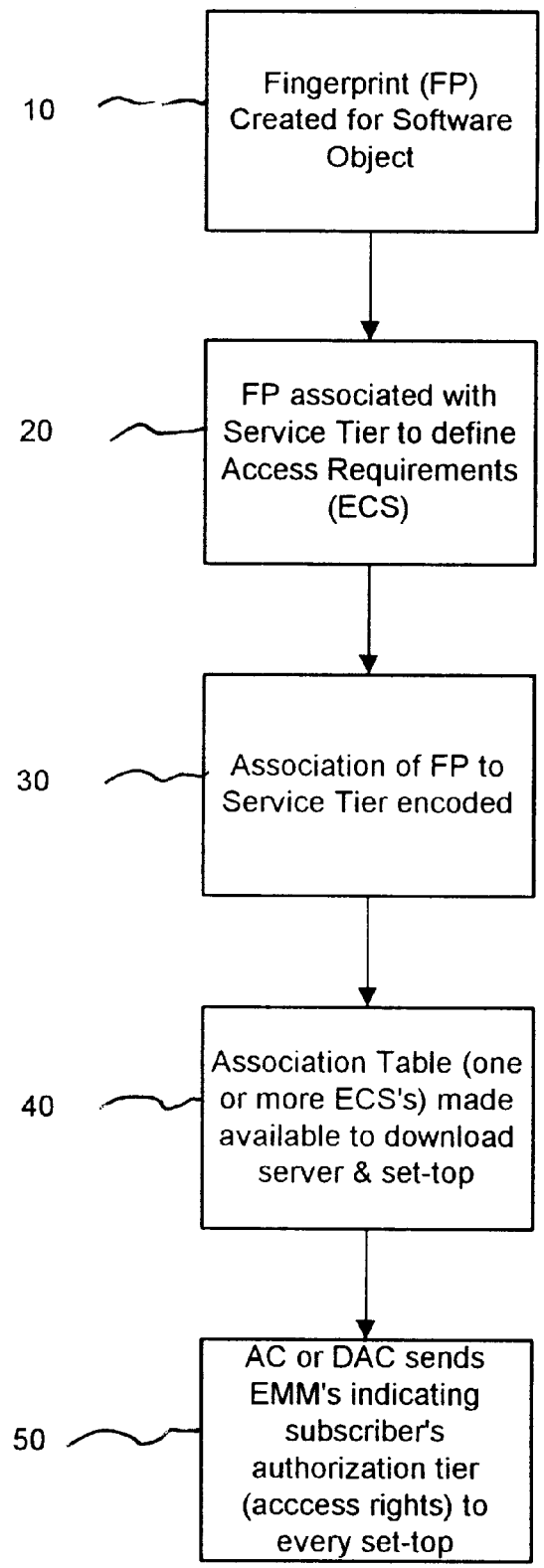
FIG. 2 is a simplified flow chart illustrating the steps performed by a multiple system cable operator (MSO) to provide authorization and access control of software object in set-top terminals.

Referring to the flow chart of FIG. 2, in step 10, a "fingerprint"; i.e., a digital signature, is created for each software object (e.g., applications, OS's, DLL's, JVM's, Java applications and applets, etc.). The fingerprint (signature) of the software object serves as a unique Entitlement Control Record (ECR). For example, each software object that the MSO wants to place in this category, i.e., under access control, is associated with a "fingerprint". Note that the fingerprint might simply be a seed for a key that could be encrypted by known means, or, it could be a value that is derived from an initial value through processing it as an image or otherwise (i.e., the fingerprint may include object size, checksum, etc.).

In particular, the fingerprint (a digital signature) may be generated by a software/HW object authentication/signature device (OASD). This is performed after the software object is verified and validated (either through inspection, testing, etc. the details of which are outside the scope of this application). The intent of the software verification and validation is to ensure that the design and implementation of the object follows a pre-specified set of rules and requirements established for security purposes. This may be done under contract to the MSO (details of which are also outside the scope of this application). The signature may be based on a unique (which may or may not be MSO-specific) object identifier and a cryptographic CRC of the object and serves as a form of certification that is unique to the software object itself (several conventional signing techniques may be employed, the details of which however are outside the scope of this application). If several software objects are associated with a service, each may be associated with a signature, and then an overall signature may be provided for the entire suite, whenever authentication of this higher level association is desired.

Continuing to step 20 of FIG. 2, the fingerprint of each software object is then associated with a service tier. Both satellite and cable access control systems utilize the concept of "tiering". For audiovisual services, a tier is a logical grouping of programs or services (the degenerate case being a single program or service). The grouping is created to facilitate control of the user's (subscriber's) access to that group of services based upon the MSO's subscriber profile (i.e., which services are subscribed to by a given consumer). The access rights of the user would demand a great deal of memory in the set-top terminal if the access rights were stored as separate flags for each and every program or object available. The tiers are typically represented as single binary digits (bits) that can be defined and redefined dynamically. Since each tier (or group) is represented as a single bit and the tiers are defined to be relevant to the service offering at a given point in time, they offer the most compact representation possible for the user's access rights (compactness is very important, since the access rights must be kept in secure memory, which is limited, and must be transmitted frequently, and as such bandwidth requirements are minimized). One or more objects may be associated with a given service/application and assigned the corresponding tiers. Additionally, while such authorization rights may be stored on a server at the other end of the network (as opposed to at the set-top terminal), where a set-top terminal may query its rights by communicating with the server in real time, it is typically advantageous to distribute this information within the set-top terminals for security, robustness, performance, as well as minimizing single point of failure effects. Once the event (or "program") terminates, or once the object(s) is no longer offered as part of a particular service, the tier definition will be updated to reflect this change. The authorization tiers for which the subscriber has been authorized are conveyed in a corresponding Entitlement Management Message (EMM) (described in further detail below in the description of FIG. 1, step 50).

In a preferred embodiment of the invention, there are two types of tiers, the first, a Subscription tier which is associated with a service (and corresponding objects) that continues over a duration of time and which is purchased ahead of actual use. The second, an Impulse Pay Per Use tier (IPPU, analogous to the Impulse Pay Per View for video programming), allows for an impulse purchase of an object or set of objects associated with a given service/application and may have a time duration associated with it. It will be appreciated by those skilled in the art that other usages, combination or conditional, can be based on these two tiers.

Referring once again to step 20 in FIG. 2, more specifically, the fingerprint to service tier association may be assigned by the MSO's access controller (Access Controller (AC) for National Control or Digital Access Controller (DAC) for local control) via the addition of a CA (conditional access) subtending signature functionality specific to objects associated with MSO's network. This function can be facilitated by OASD when it is acting as a subtending device to the MSO's AC or the DAC. As previously mentioned, OASD functionality may be embodied in an independent device (software and hardware), which in turn would communicate with the AC or the DAC to obtain the access requirement assignments (corresponding tiers for that object)

The additional MSO specific signature takes the signature of a previously signed object (i.e., the fingerprint or "digital signature" generated by the OASD), and adds to it a unique object identifier (if an MSO-specific object identifier is required). It also adds any one or more entitlement tier bits, which define the access requirements associated with the corresponding software object, and an envelope signature for the entire structure, referred to hereafter as the entitlement control structure (ECS). This unique and secret encoding of the ECS is shown in step 30.

The ECS may contain the access requirements for the object and associated resources or it may be partitioned into two ECS'S, one for the access requirements for the object and another for the resources. The latter approach is typically a more appropriate approach if the resource authorization is independent of a given object and is being performed on a set-top wide basis. However, either approach may be utilized (i.e., a combined ECS or two separate ECS's) and has no impact on how the authorization steps are performed.

The cost and free-use period, along with global set-top terminal resource restrictions, for example, may be assigned by this device as specified by the AC or the DAC (which in turn may be specified via the Billing System interface). These parameters are also conveyed as part of the ECS within the ECM.

The functionality of the OASD and the MSO's signing and creation of the ECS (steps 10–30) may be combined into a single device, subtending to the AC or the DAC, as the preferred embodiment since it is the simpler case. Either way, the physical product partitioning shouldn't alter the functional steps that need to be performed (it may optimize these steps however).

Continuing to step 40 of FIG. 2, at the MSO, the collection of unique ECS's form an association table, that is made available to a national or local download function (Downloader) associated with the AC or the DAC, respectively, and is downloaded to the digital set-top terminal (either in its entirety, or one entry at a time in an appropriate message, when downloading). Whenever the Downloader downloads protected software objects it provides the digital set-top terminal with the secret "software object fingerprint to service tier association" (ECS), which is preferably encrypted by known means before transmission. The Downloader downloads the software object in a carousel fashion while the ECS in the associated ECM's may be sent independently. It will be appreciated by those skilled in the art that this independence provides an additional security measure.

Applicants note that in an alternative embodiment of the invention, if authorization is not required, the ECS may then effectively consist of the ECR only (i.e., step 20 of FIG. 2 is not performed). The ECS in such an embodiment is piggybacked onto the downloaded object. The set-top terminal examines the ECS to perform the authentication check. The set-top download function downloads the first N bytes of the object (as indicated by the header information accompanying the downloaded object) and ignores the trailing bytes that comprise the ECS. However, the preferred embodiment described above is preferable to this embodiment for two reasons: first, the coupling of the ECS to the object removes a desirable security measure, and second, this embodiment introduces inconsistent processing between an ECS which contains only the ECR and that which contains the ECR and the service tier association. The preferred embodiment however does not restrict how the ECS may be conveyed, nor does it restrict the ECS to the type of message that specifies it (EMM or some other control message).

Again returning to the description of step 40 of FIG. 2, the Downloader may be part of the AC or the DAC since it can be viewed as a software task, or alternatively, it can be separate from the DAC, i.e., a software task running on its own HW platform.

The MSO, using the AC or the DAC (both are HW and SW devices), via parameter settings from the billing system and based on the customer profile, then controls the set-top terminal access to a specific service and associated object or set of objects by using the previously mentioned Entitlement Management Messages (EMM's) specific to that set-top terminal. These messages also establish whether the set-top terminal is allowed to utilize that software object and may also specify which set-top terminal resources (e.g., communication ports, printer port, keyboard, etc.) the object is allowed to use (when subscriber level control is desired). Additionally, the AC or the DAC may selectively assign an Impulse authorization tier (and convey the setting via the same message) to facilitate immediate authorization of the requested resource when the subscriber explicitly requests that the resource be authorized. In the case where a resource is authorized as in Impulse-authorizable resource (by associating it with an impulse tier in the message), the user may request an impulse (i.e., immediate) authorization of this resource, thereby preventing the subscriber (user) from needing to call the MSO for such authorization.

Finally, in step 50, The AC or the DAC sends the EMMs to each and every set-top terminal to enable it to download and utilize the object(s) (more specifically, when resource control is desired for a single object globally across all set-tops, the permission list for the resource control may reside in the ECS; otherwise the permissions (access rights) are conveyed to each set-top individually in an EMM). The Access Controller (or DAC) then sends the entitlement to the set-top terminal that is authorized to receive this service and associated objects (again, these entitlements are assigned in the previously described EMM's).

A system routine is created and provided in the set-top terminal, and is invoked whenever the set-top terminal is to check the authorization rights and authenticity of the software objects associated with the requested service. This system routine may be part of the core code (BIOS) in the set-top terminal. It may also be provided within the operating system (OS), or middleware. When downloading the operating system, or the JVM for example, the resident routine is invoked to check authorization rights prior to download and if so authenticate these objects post download. A second authorization stage may also be present (for some objects) to check if utilization/launch of these objects is allowed. Once the operating system is loaded, any subsequent object utilization that involves the operating system or the JVM invokes the equivalent authorization and authentication routine in the OS.

Figure 3:
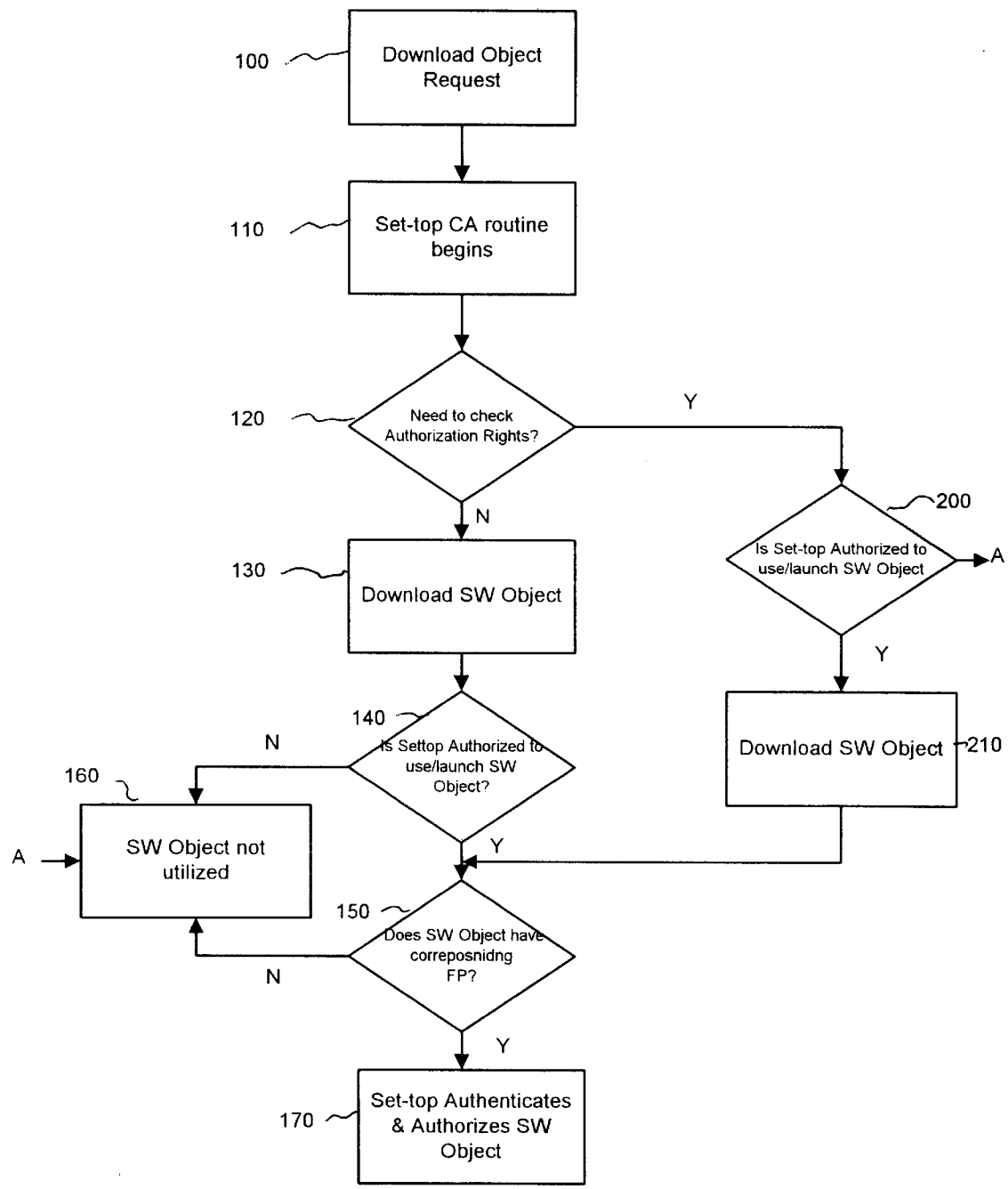
FIG. 3 is a simplified flowchart illustrating the steps performed by a Conditional Access (CA) routine, at a set-top terminal, upon invoking software object.

More specifically, the set-top terminal authenticates and authorizes a downloaded object using the EMM's and ECM's associated with a given set-top terminal and object respectively. The set-top may check the authorization rights against the authorization requirements of the software object prior to downloading the object, upon downloading the object, or whenever the object is about to be utilized. Subsequent authorization checks are optional. FIG. 3 is a flowchart illustrating the steps performed at a set-top terminal upon invoking software object.

In FIG. 3, step 100 is the download request. Accordingly, in step 110, the BIOS, operating system and/or the Java Virtual Machine (JVM), when requiring the download or the use of a software object, call(s) the set-top CA routine for an authentication and authorization check. The use or launch of the object is allowed only if the check passes. The CA check is facilitated by the secure processor. In addition, a lifetime feature may be implemented, wherein the secure processor records the object lifetime and checks it for expiration, starting for example with first use (i.e., the first time the secure processor was engaged in authenticating and authorizing the object). When expired, it may interrupt the operating system or JVM to disable/delete the object(s). If any of the checks fail, the set-top terminal may log the results to report back to the access controller. Again, this feature is a combination of software and hardware functions.

More specifically, returning to FIG. 3, in step 120 a determination is made as to whether or not there is a need to check authorization rights. If not, as shown in FIG. 3, in step 130, the software object may be downloaded to the set-top terminal prior to any authorization. However, if so, in step 200 the Conditional Access (CA) routine, before downloading the object, may determine if the set-top terminal is authorized to download the object. This step is optional and may depend upon the nature of the software object (i.e., some objects are necessary and may not require this prior authorization). If the step is performed, and if a determination is made that the set-top terminal is authorized to download the object, the process continues to step 210. If however, a determination is made in step 200 that the set-top terminal is not authorized to download the object, the process continues to step 150, where the object is not utilized.

In Step 210 the software object is downloaded to the set-top terminal and the process continues to step 150 for authentication, described in further detail below.

Alternatively, again if a determination was made in step 120 that there was no need to check authorization rights, the software object is downloaded (step 130) and as shown in step 140, the Conditional Access (CA) routine determines if the set-top terminal is authorized to use/launch the software object. Based on the determination, the software object may or may not be utilized. All unauthorized software objects will not have a corresponding tier association. The encoded "fingerprint of the software object to tier value" association (ECS) of the software object (or "application" in this example) is known only to the MSO and by definition is unique to each software object and is protected. Accordingly, if a determination is made in step 140 that the set-top terminal has not been authorized to use/launch the software object, the process continues to step 140, where the software object is not downloaded (or utilized). If the tier corresponding to the software object has been authorized however, the process continues to step 150.

Continuing to step 150, the CA routine, again with the assistance of the secure processor, checks to see if the software object has the corresponding fingerprint association. Depending on the result, the software object may or may not be utilized. For example, all unauthorized software objects will not have a corresponding fingerprint (since an unauthorized software object cannot "guess" the corresponding ECR value). In that case, the process continues to step 160, where the software object is not used. The protected fingerprint of the software object is known only to the MSO and by definition is unique to each software object. If the software object has the corresponding fingerprint association however, the process continues to step 170, where the set-top terminal authorizes and authenticates the downloaded object.

It will be appreciated by those skilled in the art that each of the authorization steps illustrated in steps 140 and 200 of FIG. 3 are optional and are not necessarily performed. In addition, although the authorization check performed in step 200 continues to step 210 and then to the authentication of step 150, additional subsequent checks could be performed by the CA routine and are well within the scope of the invention.

In addition, in a second embodiment of the invention, if the software object requires the utilization of a given set-top terminal resource, a similar checking process to determine if the software object has permission to use the required resources may occur. These permissions (authorization rights) may be associated with a given object for all set-top terminals or may be associated with a given object for a specific set-top terminal. The authorization rights to use the set-top terminal resources are conveyed in a similar manner, via EMM's.

As noted above, the authorization rights may also be designated as Impulse tiers to indicate that the subscriber may request the immediate authorization of the Impulse authorizable resource. The set-top in turn checks the request in a similar manner and if the Impulse tier is set, it registers the authorization as having taken place (for possible subsequent billing purposes).

Figure 4:
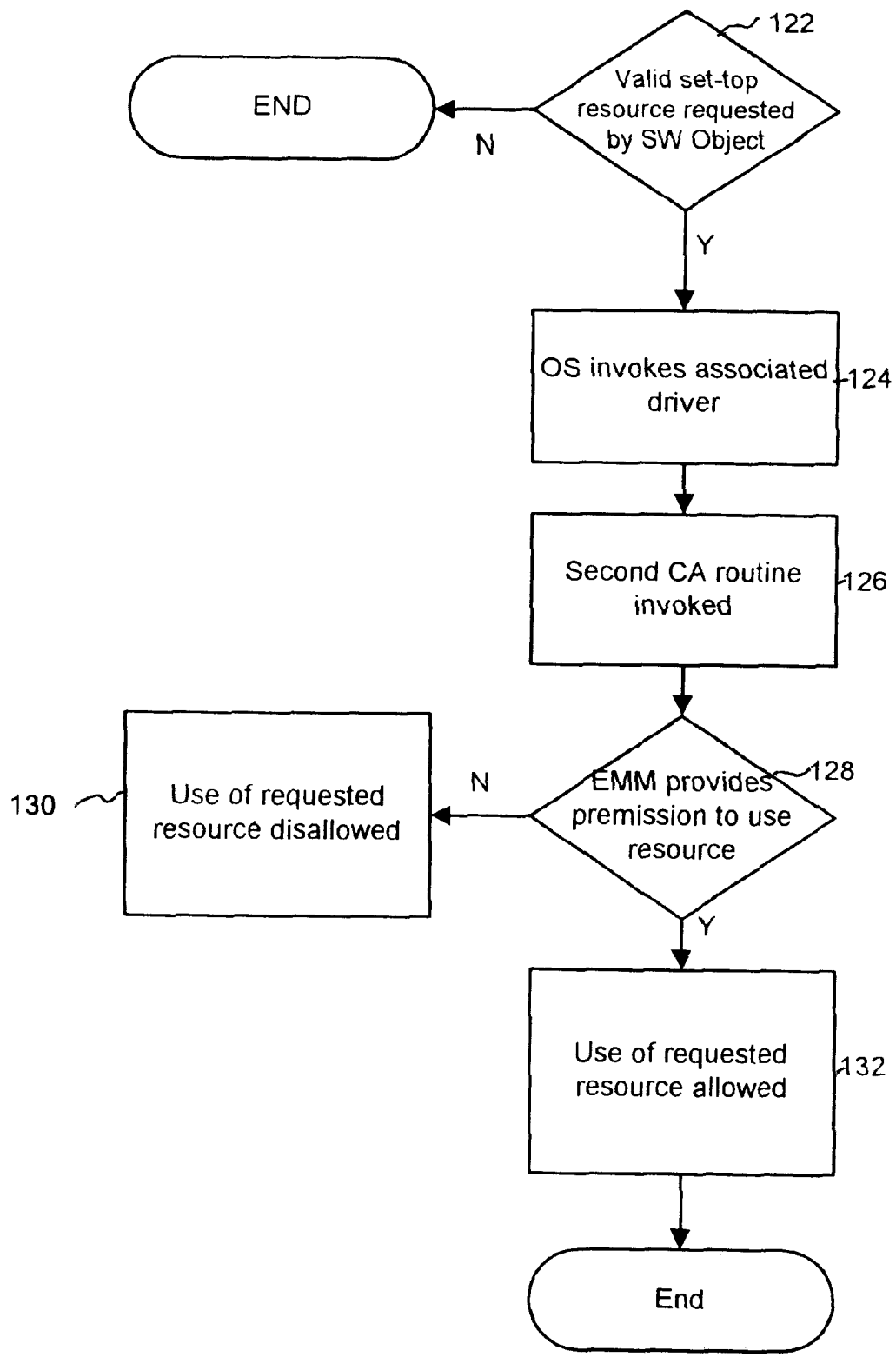
FIG. 4 is a simplified flowchart illustrating the additional steps performed by a second Conditional Access (CA) routine in another embodiment of the invention.

Each of these options is shown in FIG. 4 where in step 122, a determination is made as to whether a set-top terminal resource is requested by the software object (if software object has requested resource utilization via the OS). If step 122 determines that a valid set-top terminal resource has not been requested, no further action is taken.

If however step 122 determines that a valid set-top terminal resource has been requested, the process continues to step 124 in which the OS invokes the driver associated with the requested set-top terminal resource. Continuing to step 126, the associated driver (upon the first use only of the resource) invokes a "second Conditional Access routine" (which may be part of BIOS or the operating system) to determine if the requesting software object is allowed to use this resource. More specifically, the driver routine calls the second access control routine which, in conjunction with the secure processor, determines whether the software object may utilize the requested resource (i.e., determines if it is authorized for such use). The resource usage authorization rights are stored in secure memory as well. Specifically, in step 128 it is determined if the EMM provided permission to use the requested resource. If the EMM did not provide such permission, the process disallows the use of the requested resource (step 130) (i.e., the control goes back to the driver and then the OS with a negative result, indicating that use of the requested resource is not allowed). However, if the EMM provided permission, the utilization of the requested set-top resource is allowed in step 132.

In addition, in the case where the permissions are set as Impulse tiers (requiring an explicit request from the user for the authorization to take effect), the routine grants the authorization and registers the Impulse request within the secure processor (for possible subsequent billing purposes via a report back mechanism to the AC or the DAC).

In a still further aspect of a preferred embodiment of the invention, the driver associated with a requested resource may invoke the second CA routine only upon the first use of the resource by the software object, wherein subsequent invocations of the second conditional access routine are optional.

Finally, it will be appreciated by those skilled in the art that various methods may be implemented in order to detect any tampering to circumvent the processes described above. These methods may include periodic background checks of the software object memory, fingerprint (which may include memory size, checksum, etc.), including the set-top terminal core BIOS, Operating System, etc., against pre-calculated and protected values for each. Specifically, for example, the set-top terminal's secure processor in conjunction with the user processor can perform a memory checksum on certain critical components of the software. This may be done whenever the user processor and the secure processor have sufficient idle time to perform this function in order to minimize adverse performance effects on other functions. It may also be invoked at the operator's request via a received command message (from the MSO's controller), in the event that the MSO wants to verify the integrity of the software as part of a trouble shooting or monitoring process. The secure processor has the cryptographic checksum of the software component to be checked. The user processor, under the operating system's control, passes the memory segments comprising this object to the secure processor.

If the secure processor determines that the check has failed, it may embody the status in an encrypted format, which is incorporated in a message that is sent to the MSO's controller. The reliance on the user processor for this purpose may be minimized to ensure that these operations can not be intercepted. In addition, in the event that tampering or a transmission error (in either case, a "deviation") is detected, additional indications may be provided, for example, flagging the set-top terminal's unique address to the MSO/headend to shut off all or some of the subscriber's services, notifying a local or national Access Control Center of the event, the time, the unique set-top terminal address, geographic location, etc.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A method for providing authorization and access control of software object residing in digital set-top terminals, comprising the steps of:
   creating a fingerprint for each software object;
   associating each fingerprint with a service tier;
   encoding each association made in said associating step;
   creating an association table containing the information generated in said encoding step;
   downloading the association table to the digital set-top terminal;
   transmitting a message, providing an indication of what software the set-top terminal may utilize, to the digital set-top terminal; and
   providing a system routine at the digital set-top terminal that is invoked whenever software object has been downloaded or is about to be utilized,
   wherein the system routine uses the association table to determine if the software object about to be invoked has been authorized for the set-top terminal.

2. The method of claim 1, further wherein the software object has been verified and validated prior to the recited steps.

3. The method of claim 1, further comprising the steps of:
   recording a lifetime of the software object; and
   starting with a first use, checking the lifetime of the software object for expiration.

4. The method of claim 3, wherein if a determination is made in said checking step that the software object lifetime has expired, further comprising the step of disabling the software object.

5. The method of claim 1, wherein if a plurality of software objects are associated with a service, further comprising the step of:
   creating a fingerprint for the plurality of software objects as a group.

6. The method of claim 1, wherein the transmitted message further indicates which set-top terminal resources the software object is authorized to utilize.

7. The method of claim 6, wherein an impulse authorization service tier may be assigned to facilitate immediate authorization of a resource.

8. The method of claim 7, wherein the impulse authorization service tier has a time duration associated with it.

9. The method of claim 1, further wherein the transmitted message in said transmitting step provides the indication by setting the corresponding service tiers.

10. The method of claim 1, further wherein if the service tier has not been authorized, the software object is not executed.

11. The method of claim 1, further wherein if the service tier has been authorized, the system routine checks determines if the software object about to be utilized passes a corresponding fingerprint check.

12. The method of claim 11, wherein if the software object about to be utilized passes the corresponding fingerprint check, further comprising the step of:
   determining if the use of a set-top terminal resource has been requested.

13. The method of claim 12, wherein if a determination is made in said determining step that the use of a set-top terminal resource has been requested, further comprising the step of:

providing a second system routine at the digital set-top terminal.

14. The method of claim 12, wherein if a determination is made in said determining step that the use of a set-top terminal resource has been requested, further comprising the step of:
determining if it is the first time that use of the set-top terminal resource by the software object has been requested,
wherein if it is the first time that use of the resource has been requested, providing a second system routine at the digital set-top terminal.

15. The method of claim 13, wherein the second system routine uses the transmitted messages to determine if the software object may utilize the requested set-top terminal resource.

16. The method of claim 11, further wherein if the software object about to be utilized does not have a corresponding fingerprint, the software object is not executed.

17. The method of claim 1, wherein the fingerprint of the software object residing in the set-top terminal is periodically compared to a reference value and an indication of a deviation is provided.

18. A method for providing authorization and access control of applications executing in digital set-top terminals, comprising the steps of:
associating each application with a service tier;
encoding each association made in said associating step;
creating an association table containing the information generated in said encoding step;
downloading the association table to the digital set-top terminal; and
providing a system routine at the digital set-top terminal that is invoked whenever an application is invoked,
wherein the system routine uses the application association or the association table to determine if an invoked application is associated with a service tier, and
wherein if the invoked application is not associated with a service tier, the application is not utilized.

19. The method of claim 18, further wherein if an invoked application is associated with a service tier, the system routine further determines if the tier corresponding to the service/application has been authorized.

20. The method of claim 18, wherein when set-top terminal resource control is desired for a single application across all set-tops, further comprising the step of:
providing an indication of the set-top terminal resource control in the encoded associations, wherein a second system routine uses the association table to determine if the software object may utilize the requested set-top terminal resource.

21. The method of claim 18 wherein set-top terminal resource control indications are conveyed to each set-top individually.

22. The method of claim 18, wherein the software memory size of critical software components of the digital set-top terminal are periodically compared to a reference value and an indication of a deviation is provided.

23. The method of claim 18, wherein the software size of the operating system of the digital set-top terminal is periodically compared to a reference value and an indication of a deviation is provided.

24. The method of claim 18, wherein the software object memory size of the application code image in the digital set-top terminal is periodically compared to a reference value and an indication of a deviation is provided.

25. The method of claim 18, wherein the checksum of critical software components of the digital set-top terminal is periodically compared to a reference value and an indication of a deviation is provided.

26. The method of claim 18, wherein the checksum of the operating system of the digital set-top terminal is periodically compared to a reference value and an indication of a deviation is provided.

27. The method of claim 18, wherein the checksum of the software object in the digital set-top terminal is periodically compared to a reference value and an indication of a deviation is provided.

28. A system for providing authorization and access control of software object residing in digital set-top terminals, comprising:
a multiple system cable operator site comprising:
means for creating a fingerprint for each software object;
means for assigning each fingerprint to a service tier;
encoding means for encoding each association made in said associating step;
means for creating an association table/message containing the information generated in said encoding step;
means for downloading the association table to the digital set-top terminal;
means for transmitting a message, providing an indication of what software the set-top terminal may utilize, to the digital set-top terminal; and
a digital set-top terminal comprising:
a system routine that is invoked whenever software object has been downloaded or is about to be utilized,
wherein the system routine uses the association table/ message to determine if the software object about to be invoked has been authorized for the set-top terminal.

29. The system of claim 28, wherein said means for creating a fingerprint comprises an independent software/ HW object authentication.signature device (OASD).

30. The system of claim 29, wherein the OASD comprises said means for assigning each fingerprint to a service tier.

31. A digital set-top terminal, operating together with a multiple system cable operator system to provide authorization and access control of software object residing in the digital set-top terminal, the set-top terminal comprising:
a system routine that is invoked whenever software object has been downloaded or is about to be utilized,
wherein the system routine uses an association table/ message, created at the MSO and downloaded to the set-top terminal, to determine if the software object about to be invoked has been authorized for the set-top terminal,
and further wherein the association table/message comprises an encoded fingerprint to service tier association corresponding to the software object.

* * * * *

UNITED STATES PATENT AND TRADEMARK OFFICE
CERTIFICATE OF CORRECTION

PATENT NO.    : 6,256,393 B1
DATED         : July 3, 2001
INVENTOR(S)   : Reem Safadi et al.

It is certified that error appears in the above-identified patent and that said Letters Patent is hereby corrected as shown below:

<u>Column 5,</u>
Line 29, after "object)", insert -- . --.

<u>Column 12, claim 29,</u>
Line 46, change "authenication.signature" to -- authentication/signature --.

Signed and Sealed this

Twenty-sixth Day of February, 2002

Attest:

JAMES E. ROGAN
Attesting Officer     Director of the United States Patent and Trademark Office